No. 789,049. PATENTED MAY 2, 1905.
H. N. MIDDLETON.
ELIMINATOR.
APPLICATION FILED DEC. 17, 1903.

Witnesses:
Frank L. A. Graham
Hamilton D. Turner

Inventor:
Harry N. Middleton.
by his Attorneys,
Howson & Howson

No. 789,049.                                            Patented May 2, 1905.

UNITED STATES PATENT OFFICE.

HARRY N. MIDDLETON, OF WESTVILLE, NEW JERSEY, ASSIGNOR OF ONE-HALF TO CHARLES H. GIFFORD, OF PHILADELPHIA, PENNSYLVANIA.

ELIMINATOR.

SPECIFICATION forming part of Letters Patent No. 789,049, dated May 2, 1905.

Application filed December 17, 1903. Serial No. 185,555.

*To all whom it may concern:*

Be it known that I, HARRY N. MIDDLETON, a citizen of the United States, and a resident of Westville, Gloucester county, New Jersey, have invented certain Improvements in Eliminators for Separating Heavy Particles of Material from Air, Gas, or Liquids, of which the following is a specification.

The object of my invention is to separate heavy particles of material from air, gases, or liquids as they escape from a flue or conductor.

My invention is especially applicable to flues for carrying off waste material from machines and for separating dust from grain, but may be used to separate liquid from vapor.

Figure 1:
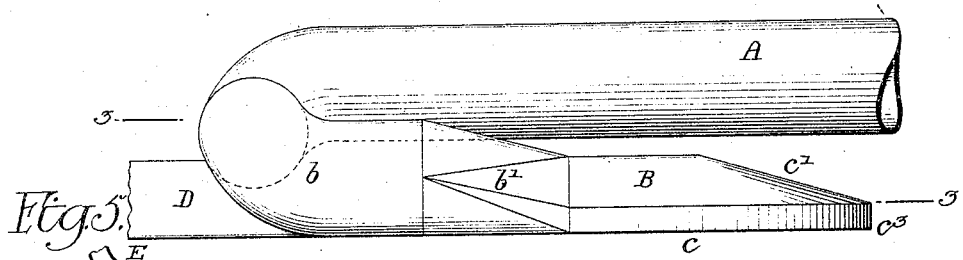
Figure 2:
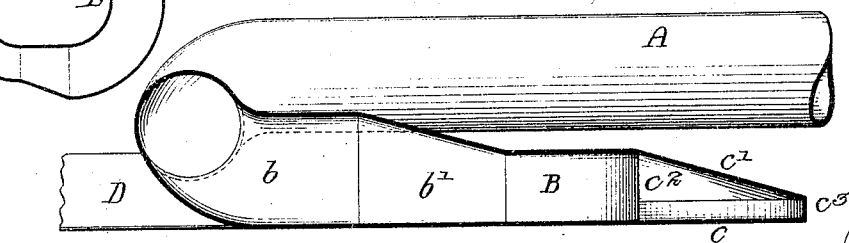
Figure 3:
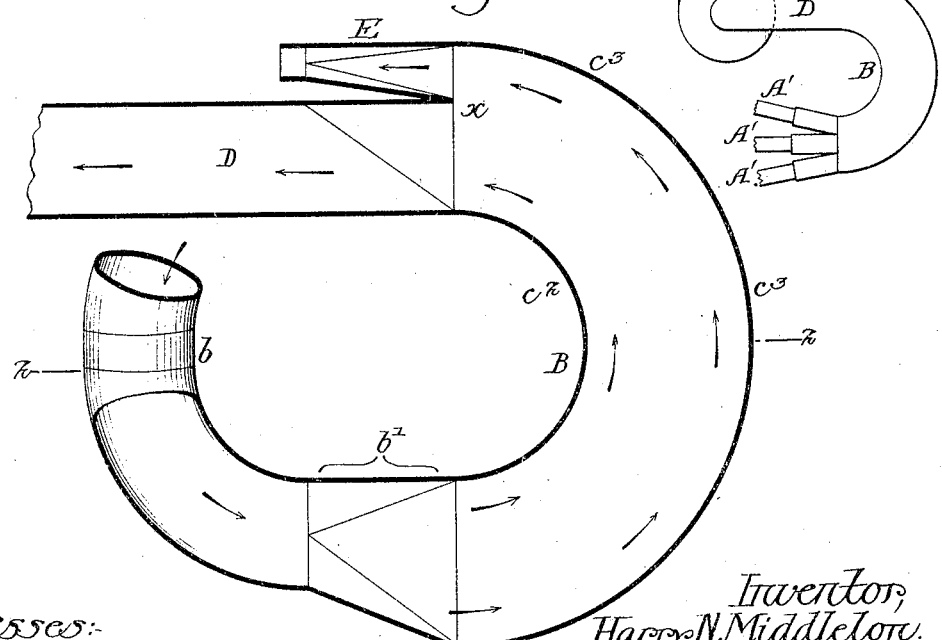

In the accompanying drawings, Figure 1 is a side view of my improved eliminator. Fig. 2 is a section on the line 2 2, Fig. 3. Fig. 3 is a sectional plan view on the line 3 3, Fig. 1; and Figs. 4 and 5 are views of modifications of my invention.

A is a pipe or flue leading from a machine or bin or may be connected to the stack of a furnace. This flue communicates with a section $b$ of my improved eliminator B, which in the present instance is in the form of a segment of a circle.

The body of the eliminator is preferably shaped as shown in Figs. 1 and 2, although it may be modified without departing from my invention.

In the present instance the section $b$ is circular in cross-section and is connected to a union section $b'$, which communicates direct with the main body of the eliminator. This body has a flat under portion $c$ and inclined upper portion $c'$. The inner wall $c^2$ of the eliminator is preferably higher than the outer wall $c^3$.

At the outer end of the eliminator are two exhaust-passages D and E. The outlet-passage E is in line with the outer wall $c^3$ of the eliminator and may connect with any suitable collector or with an exhaust-fan for the purpose of creating a suction in this outlet, while the passage D is open to the atmosphere or may be connected to any suitable duct or passage leading to any point desired.

I will describe my invention as used to collect the cinders from forges, for instance, although it will be understood that my invention is not limited to this use, but may be used for a number of purposes, as mentioned above.

The conductor A may extend to the forge or any number of forges, and the products of combustion will pass through this conductor to the eliminator, and as they pass into the eliminator the cinders or heavy particles will be separated by centrifugal force from the lighter particles and will travel near or in contact with the outer wall $c^3$ of the eliminator, while the lighter particles will travel in another path. Consequently when these heavy particles reach the outlet $x$ of the eliminator they will pass through the flue E, and if this flue is connected to an exhaust-fan they will be drawn away and deposited in any suitable collector, while the smoke and lighter particles will pass through the main flue or duct D.

In some instances I may connect the main exhaust D with an exhaust F, as shown in Fig. 4, or with a stack, so as to produce sufficient current to draw the material through the eliminator, and in this event I prefer in most instances to connect the passage E, which is on a line with the periphery of the eliminator, with a closed chamber G for the collection of the heavy particles, so as to avoid a counter-current; but in some instances, particularly where very heavy material is to be separated and light particles are carried with it, I produce a light counter-current for the purpose of separating these light particles from the heavy material as they pass from the eliminator.

As shown in Fig. 5, I may provide one or more outlets E' at the periphery of the eliminator in addition to the outlet E to relieve the eliminator of heavy particles, if desired, and I may connect any number of inlet-pipes A' with the eliminator, as shown in Fig. 4.

I claim as my invention—

1. The combination in an eliminator having a curved section, the inner wall of the eliminator being higher than the outer wall, an inlet, and two outlets, one outlet being on a line with the outer wall, substantially as described.

2. The combination in an eliminator having a curved section, the outer wall of the curved section being lower than the inner wall, and the upper portion of the eliminator being inclined toward the outer wall, an inlet-pipe communicating with one end of the eliminator, and two exhaust-passages communicating with the opposite end of the eliminator, one exhaust-passage being on a line with the outer wall of the eliminator and being less in diameter than the other passage, substantially as described.

In testimony whereof I have signed my name to this specification in the presence of two subscribing witnesses.

HARRY N. MIDDLETON.

Witnesses:
 WILL. A. BARR,
 JOS. H. KLEIN.